(12) United States Patent
Waisanen

(10) Patent No.: US 8,526,565 B2
(45) Date of Patent: Sep. 3, 2013

(54) FUEL TRANSFER SYSTEM

(75) Inventor: Steven K. Waisanen, Big Bend, WI (US)

(73) Assignee: MHE Technologies, Inc., Wilmington, DE (US)

( * ) Notice: Subject to any disclaimer, the term of this patent is extended or adjusted under 35 U.S.C. 154(b) by 728 days.

(21) Appl. No.: 12/301,882

(22) PCT Filed: Nov. 21, 2006

(86) PCT No.: PCT/US2006/061130
§ 371 (c)(1),
(2), (4) Date: Jul. 6, 2010

(87) PCT Pub. No.: WO2007/139590
PCT Pub. Date: Dec. 6, 2007

(65) Prior Publication Data
US 2010/0272224 A1    Oct. 28, 2010

Related U.S. Application Data

(60) Provisional application No. 60/802,584, filed on May 23, 2006.

(51) Int. Cl.
*G21C 21/02* (2006.01)
*G21C 21/00* (2006.01)

(52) U.S. Cl.
USPC .......................... 376/261; 376/260; 414/146

(58) Field of Classification Search
USPC ................. 104/2, 3; 198/300, 306; 414/146, 414/288, 290, 339, 373, 376–379; 376/260–271
See application file for complete search history.

(56) References Cited

U.S. PATENT DOCUMENTS

| 1,364,883 | A | * | 1/1921 | McDonald | 104/3 |
|---|---|---|---|---|---|
| 1,589,091 | A | * | 6/1926 | Barber | 198/306 |
| 1,732,207 | A | * | 10/1929 | Shafer, Jr. | 414/379 |
| 3,376,988 | A | * | 4/1968 | Klosk | 414/339 |
| 3,629,062 | A | * | 12/1971 | Muenchow | 376/271 |
| 3,637,096 | A | * | 1/1972 | Crate | 376/268 |
| 3,765,549 | A | * | 10/1973 | Jones | 414/290 |
| 3,768,668 | A | * | 10/1973 | Schukei | 376/262 |
| 3,940,577 | A | * | 2/1976 | Christofer | 414/146 |
| 3,941,259 | A | * | 3/1976 | Hoffmeister et al. | 376/262 |
| 4,053,067 | A | * | 10/1977 | Katz et al. | 376/268 |
| 4,069,766 | A | * | 1/1978 | Bernstein | 414/146 |
| 4,113,558 | A | * | 9/1978 | Wade | 376/271 |

(Continued)

OTHER PUBLICATIONS

Rahn et al., "A Guide to Nuclear Power Technology", Krieger Publishing Company (Malabar Florida),1992, pp. 287-288.

*Primary Examiner* — Bernarr Gregory
(74) *Attorney, Agent, or Firm* — Porter, Wright, Morris & Arthur, LLP

(57) ABSTRACT

A fuel transfer system is used for transporting spent fuel from a first room to a second room. The system includes a carriage configured for travel between the first room and the second room, and a boom assembly that extends and retracts between the first room and the second room, wherein the boom assembly facilitates travel of the carriage. The system also includes a hoist system positioned in the first room. The hoist system includes at least one boom cable interconnected with the boom assembly to extend and retract the boom assembly. The hoist system also includes at least one carriage cable interconnected with the carriage to move the carriage.

24 Claims, 13 Drawing Sheets

(56) References Cited

U.S. PATENT DOCUMENTS

| | | | |
|---|---|---|---|
| 4,572,710 A * | 2/1986 | Stock et al. | 414/146 |
| 4,649,016 A * | 3/1987 | Hardin, Jr. | 376/261 |
| 4,749,541 A * | 6/1988 | Hardin | 376/261 |
| 4,761,107 A * | 8/1988 | Frantti | 414/146 |
| 4,957,405 A * | 9/1990 | Roberts et al. | 414/339 |
| 5,069,863 A * | 12/1991 | Meuschke et al. | 376/270 |
| 5,291,532 A * | 3/1994 | Townsend et al. | 376/269 |
| 5,687,207 A * | 11/1997 | Meuschke et al. | 376/264 |
| 7,321,650 B2 * | 1/2008 | Meintker | 376/268 |
| 2005/0100123 A1 | 5/2005 | Meintker | |

* cited by examiner

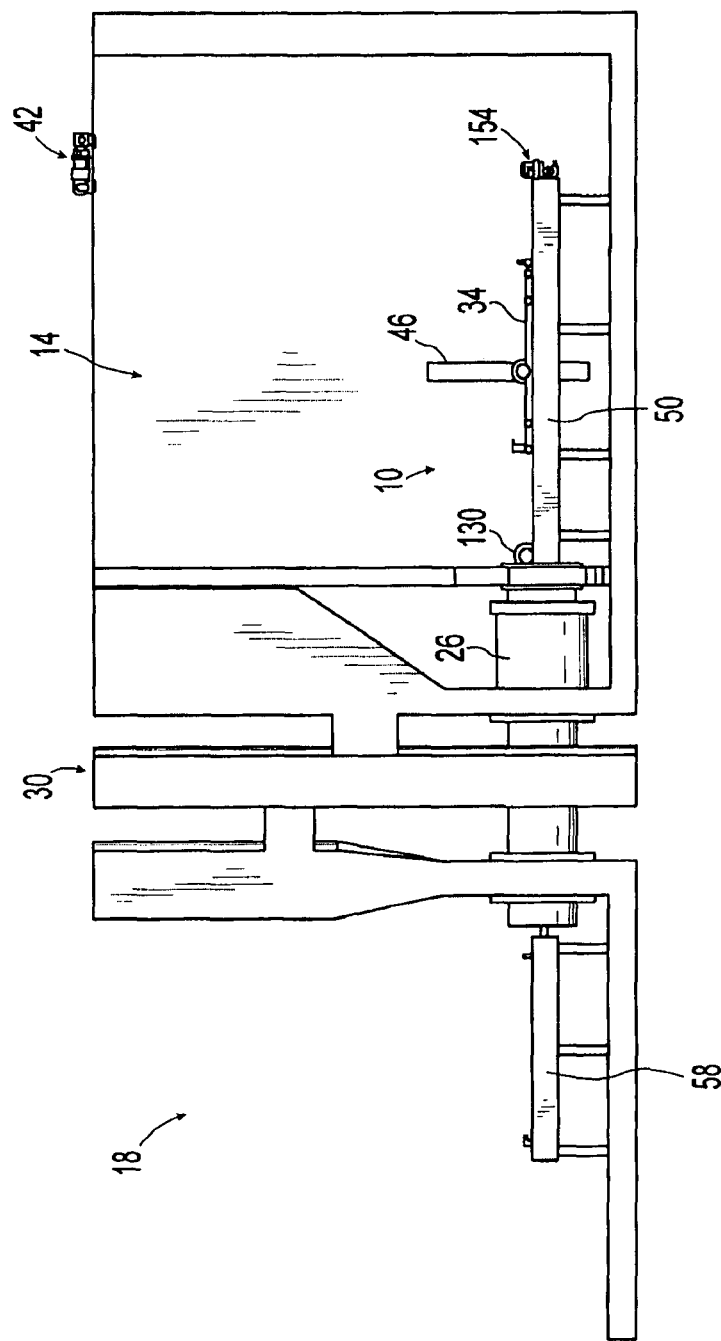

FUEL TRANSFER SYSTEM

CROSS-REFERENCE TO RELATED APPLICATIONS

This application claims priority from U.S. Provisional Application No. 60/802,584, entitled "Fuel Transfer System," filed May 23, 2006 by Steven K. Waisanen.

BACKGROUND

The present invention relates to a pressurized water reactor, and in particular to a fuel transfer system for use in the reactor.

Fuel transfer systems currently used in pressurized water reactors (PWR) and other reactors are inconvenient to repair and the repair process is time-consuming. For example, some systems use air cylinders to up-end and down-end a fuel transfer container. Holes may develop in associated air hoses that disable the system or cause the system to operate unreliably. Further, downtime of the fuel transfer system to perform maintenance on the system components is high and often occurs during the critical path of the system cycle. Another disadvantage is the number of components in current fuel transfer systems that need to interface to move a fuel transfer car to and from the reactor building.

SUMMARY

In one embodiment, the invention provides a fuel transfer system for transporting spent fuel from a first room to a second room. The system includes a carriage configured for travel between the first room and the second room, and a boom assembly that extends and retracts between the first room and the second room, wherein the boom assembly facilitates travel of the carriage. The system also includes a hoist system positioned in the first room. The hoist system includes at least one boom cable interconnected with the boom assembly to extend and retract the boom assembly. The hoist system also includes at least one carriage cable interconnected with the carriage to move the carriage.

In another embodiment, the invention provides a fuel transfer system for transporting spent fuel from a first room to a second room. The system includes a carriage configured for travel between the first room and the second room. The carriage includes a container pivotably mounted to the carriage. The system also includes a boom assembly that extends and retracts between the first room and the second room, wherein the boom assembly facilitates travel of the carriage. The system further includes a hoist system positioned in the first room. The hoist system includes at least one boom cable interconnected with the boom assembly to extend and retract the boom assembly. The hoist system also includes at least one carriage cable interconnected with the carriage to extend and retract the carriage and to up-end and down-end the container relative to the carriage.

In another embodiment, the invention provides a fuel transfer system for transporting spent fuel from a first room to a second room. The system includes a carriage configured for travel between the first room and the second room. The system also includes a first boom configured to extend from the first room toward the second room, and a second boom slidably received by the first boom and configured to extend into the second room, wherein extension of the first boom and the second boom facilitates travel of the carriage. The system further includes a hoist system positioned in the first room. The hoist system includes a boom cable interconnected with the first boom and the second boom to extend and retract the first boom and the second boom. The hoist system also includes at least one carriage cable interconnected with the carriage to move the carriage.

In yet another embodiment, the invention provides a fuel transfer system for transporting spent fuel from a first room to a second room. The system includes a track system extending between the first room and the second room, and a carriage configured for travel on the track system. The carriage includes a container pivotably mounted to the carriage and rotatable between an up-ended and a down-ended position. The system also includes a first boom configured to extend from the first room toward the second room, and a second boom slidably received by the first boom and configured to extend into the second room, wherein extension of the first boom and the second boom facilitates travel of the carriage between the first room and the second room. The system further includes a hoist system positioned in the first room and having a boom hoist and a carriage hoist. The boom hoist includes at least one boom cable interconnected with the first boom and the second boom to extend and retract the first boom and the second boom. The carriage hoist includes at least one carriage cable coupled to the carriage to move the carriage and up-end and down-end the container.

Other aspects of the invention will become apparent by consideration of the detailed description and accompanying drawings.

BRIEF DESCRIPTION OF THE DRAWINGS

FIG. 2 is a side view of the fuel transfer system shown in FIG. 1A with a spent fuel container in an up-ended position.

Figure 1A:
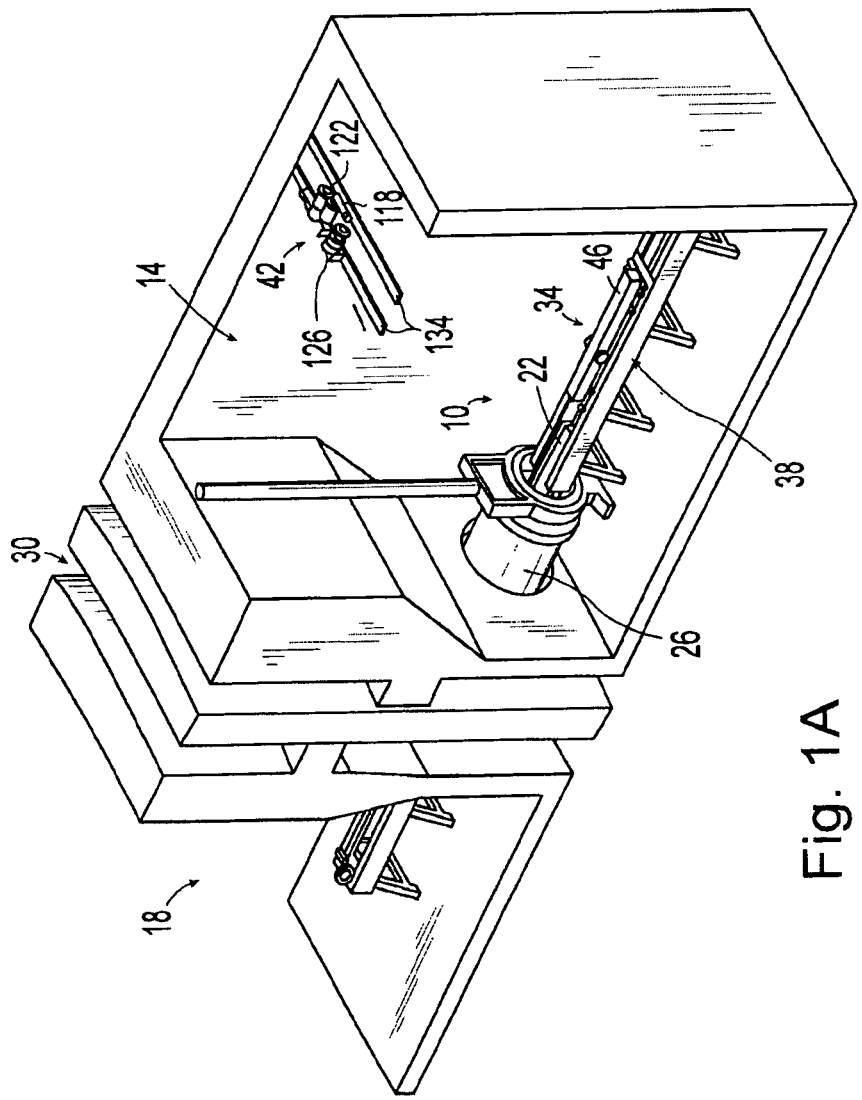
FIG. 1A illustrates a fuel transfer system according to one embodiment of the invention, the fuel transfer system at a home position within a holding area (i.e., a reactor building) of a pressure water reactor (PWR) facility.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Referring to FIGS. 1A-1B and 2-4, a fuel transfer system 10 is used for transferring fuel bundles between a reactor building 14 (i.e., a holding room) of a pressurized water reactor (PWR) facility, or other nuclear reactor facility, and a containment building 18 (i.e., a containment side) of the facility. The fuel transfer system 10 includes a boom assembly 22 (FIGS. 5A, 5B, and 6) that telescopes from the reactor building 14, through a canal 26 in a containment wall 30 separating the reactor building 14 and the containment building 18, and into the containment building 18. Once the boom assembly 22 is in an extended position, a fuel transfer carriage 34 may travel on a track system 38 to the containment building 18 from the reactor building 14. Both the boom assembly 22 and the carriage 34 are deployed using a wire rope rewind hoisting system 42, or other hoisting system or mechanical means. The carriage 34 is capable of down-ending (FIGS. 1B and 3) and up-ending (FIGS. 2 and 4) a fuel bundle container 46. The hoisting system 42 moves the carriage 38 between the two buildings 14, 18, extends and retracts the boom assembly 22, and up-ends and down-ends the container 46.

Figure 1B:
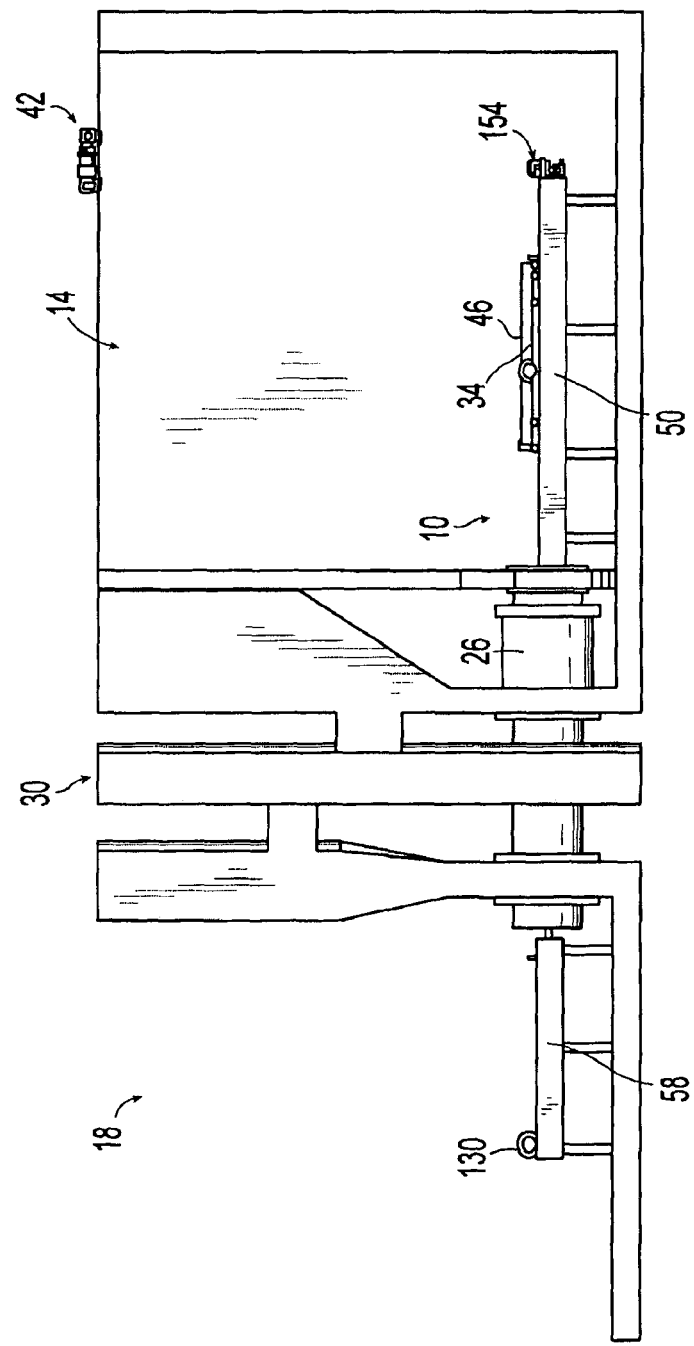
FIG. 1B is a side view of the fuel transfer system shown in FIG. 1A.
Figure 3:
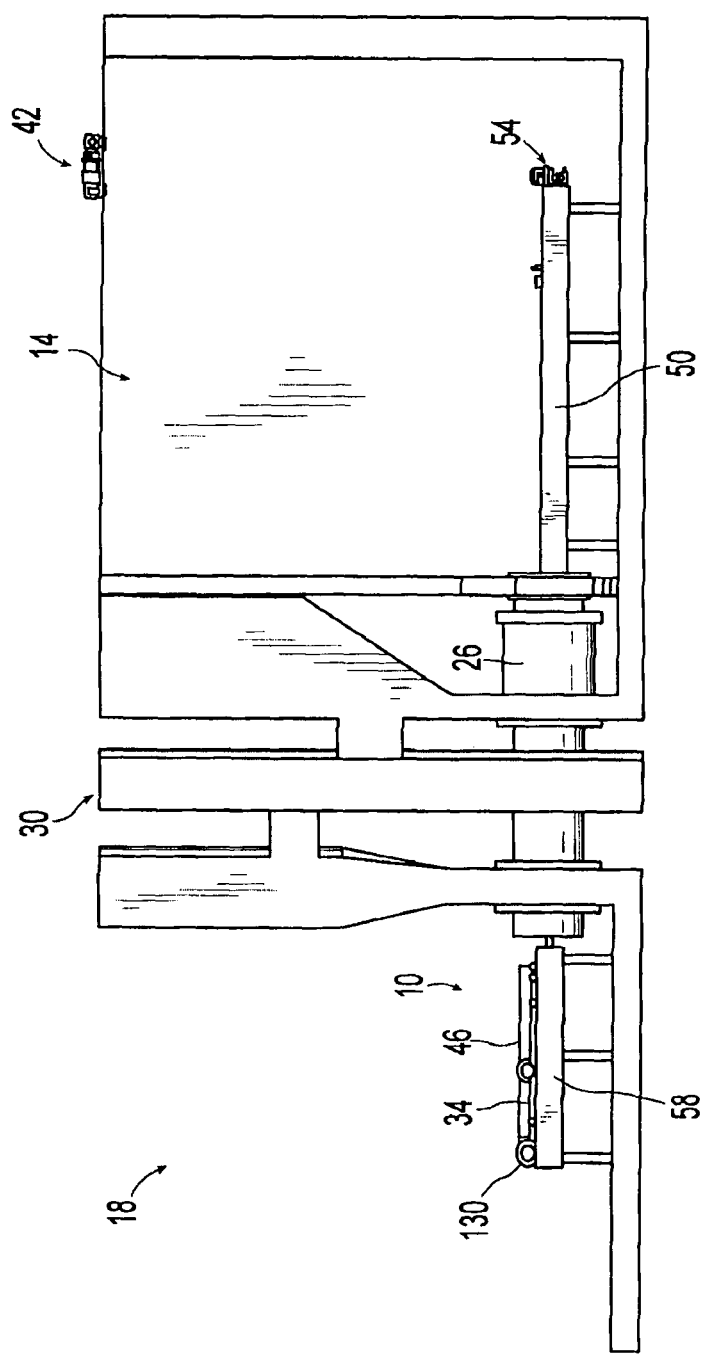
FIG. 3 is a side view of the fuel transfer system shown in FIG. 1A at an unloading position within a containment area (i.e., a containment building) of the facility.
Figure 4:
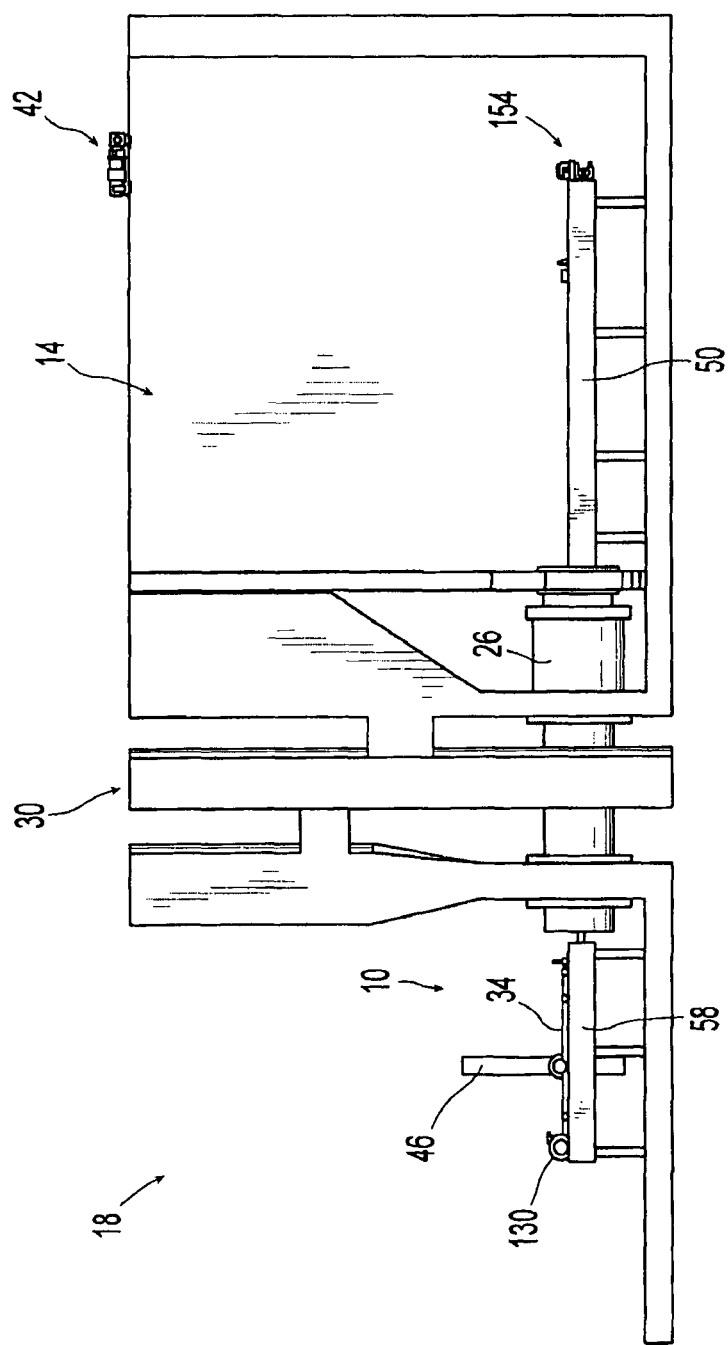
FIG. 4 is a side view of the fuel transfer system shown in FIG. 1A with the container in an up-ended position.
Figure 5A:
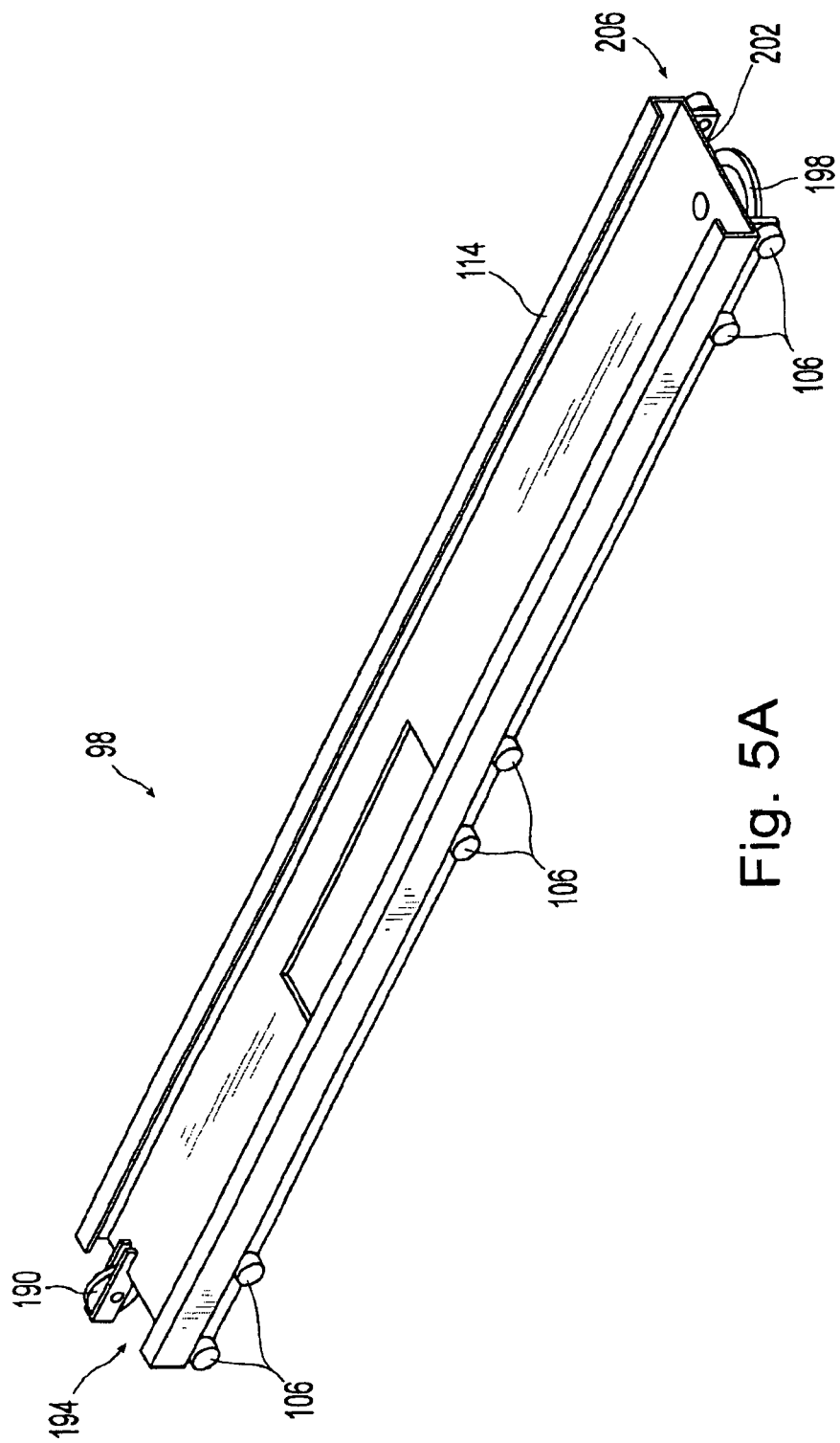
FIG. 5A illustrates a main boom for use with the fuel transfer system.
Figure 5B:
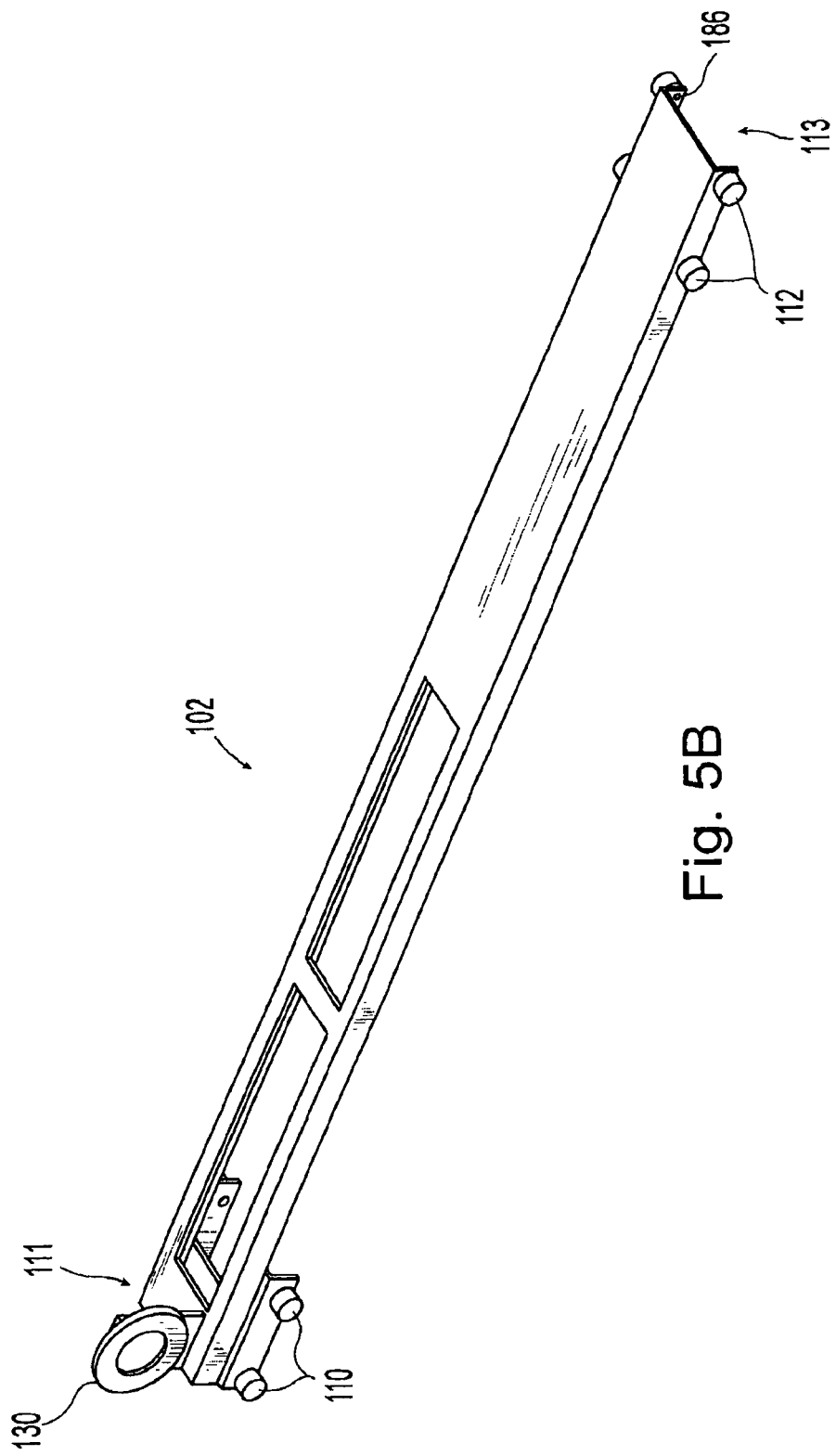
FIG. 5B illustrates a secondary boom for use with the fuel transfer system.

In operation, the fuel transfer system 10 starts at a home position with the carriage 34 in the reactor building 14 and the container 46 in a down-ended position, as shown in FIGS. 1A and 1B. Referring to FIG. 2, the container 46 is rotated to an up-ended position and a fuel bundle (not shown) is deposited in the container 46. In one embodiment, the fuel bundle is picked up and deposited into the container 46 by a pick crane (not shown). The container 46 is then rotated to the down-ended position and the carriage 34 is moved to an unloading position in the containment building 18, as shown in FIG. 3. Referring to FIG. 4, once the carriage 34 comes to a stop in the containment building 18, the container 46 is rotated to the up-ended position. In the up-ended position a pick crane (not shown) picks the fuel bundle from the container 46 and deposits the bundle in a spent fuel pool (not shown).

In one embodiment, a technician operates a controller, such as a programmable logic controller (PLC), a contactor controller, a digital controller, an adjustable frequency controller, or an infinitely variable controller (e.g., a Static Stepless™ controller provided by P&H Mining Equipment of Milwaukee, Wis.), to control operation of the fuel transfer system 10, including the hoisting system 42. Furthermore, the hoisting system 42 may be operated by hand cranks in situations where power is not available for the controller. In a further embodiment, the fuel transfer system 10 is operated by a microprocessor, such that the entire process is automated.

The fuel transfer system 10 includes moving parts incorporated into a single apparatus that is capable of being serviced during off or outage time. All of the moving parts of the fuel transfer system 10 are located within the reactor building 14 of the facility, or movable to the reactor building 14. Therefore, maintenance downtimes are decreased and access to the system 10 during outage time is possible. In the illustrated embodiment, the fuel transfer system 10 (except the hoists) is under water. However, it should be readily apparent to those of skill in the art that other components of the system may be positioned above water.

Figure 7A:
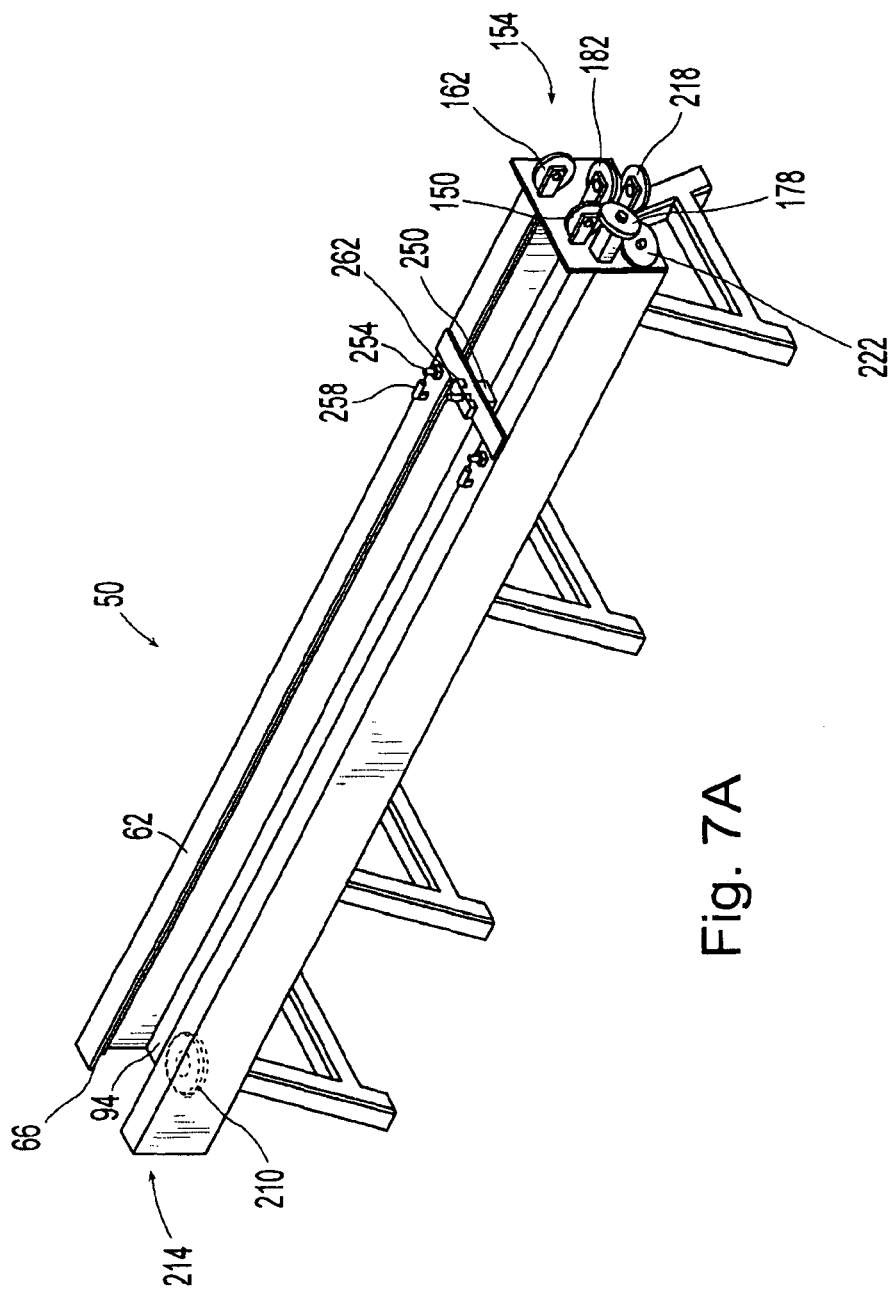
FIG. 7A illustrates a holding room track assembly for use with the fuel transfer system.
Figure 7B:
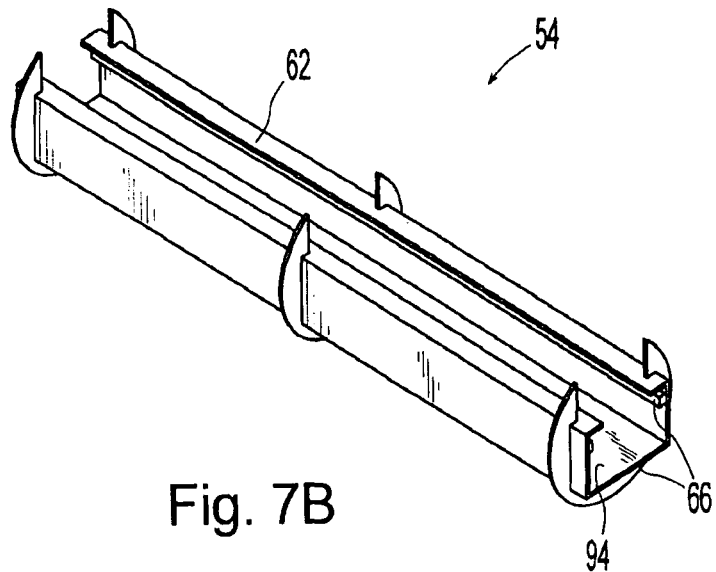
FIG. 7B illustrates a canal track assembly for use with the fuel transfer system.
Figure 7C:
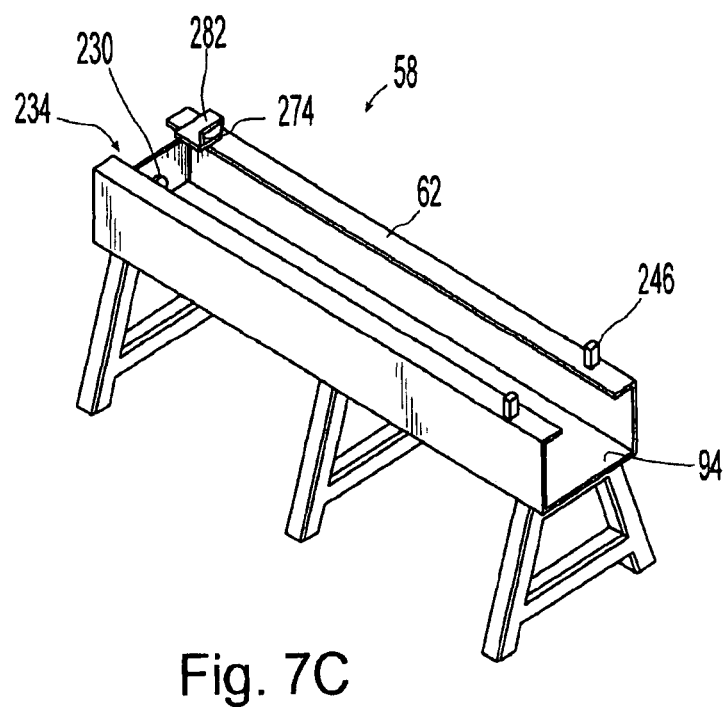
FIG. 7C illustrates a containment room track assembly for use with the fuel transfer system.

In the illustrated embodiment, the fuel transfer system 10 includes three track assemblies that are interconnected to form the track system 38, or path, that passes through the containment wall 30 and between the reactor building 14 and the containment building 18. A holding room track assembly 50 (FIG. 7A) is positioned in the reactor building 14 of the facility, a canal track assembly 54 (FIG. 7B) is positioned in the canal 26, and a containment track assembly 58 (FIG. 7C) is positioned in the containment building 18 the facility. The canal track assembly 54 passes through the containment wall 30 to connect the holding room track assembly 50 and the containment track assembly 58. The containment wall 30 defines the canal 26 where the canal track 54 assembly is located. Each track assembly 50, 54, 58 defines a rail 62 on which the carriage 34 travels. At least the holding room track assembly 50 and the canal track assembly 54 include an inner rail 66 for supporting the carriage 34.

Figure 8A:
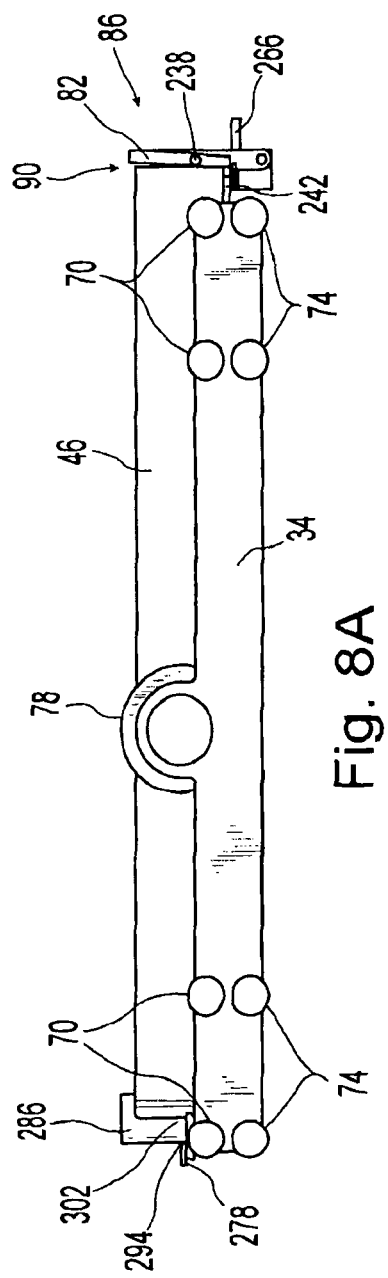
FIG. 8A illustrates the carriage supporting the container with the container in a down-ended position.
Figure 8B:
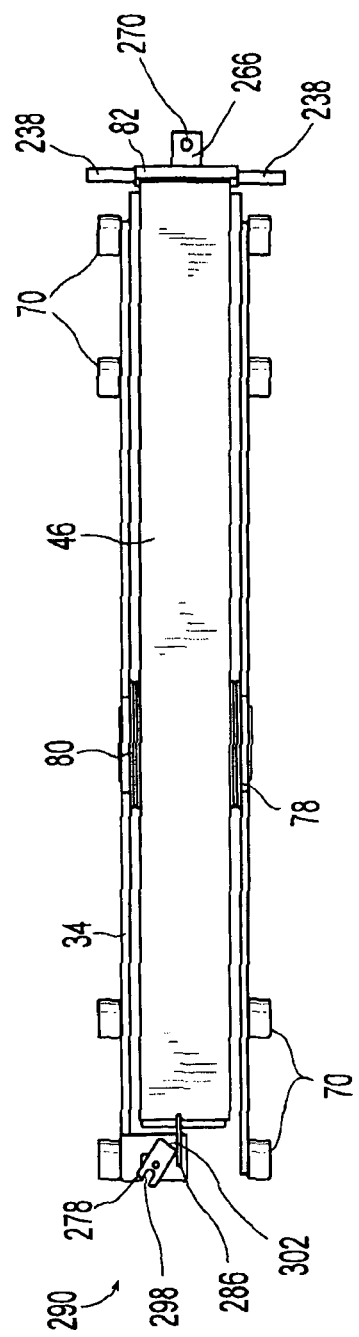
FIG. 8B is a top view of the carriage shown in FIG. 8A.

The fuel transfer system 10 includes the fuel transfer carriage 34 that travels upon the rail 62 of the track assemblies 50, 54, 58 and moves between the reactor building 14 and the containment building 18 through the canal 26. Referring to FIGS. 8A and 8B, the carriage 34 includes upper rollers 70 for riding on the rails 62, and lower rollers 74 for riding between the track rails 62 and the inner rails 66. The carriage 34 includes the container 46 pivotably coupled to the carriage 34 for storing fuel bundles during a transfer process. First container sheave 78 and second container sheave 80 are positioned inside opposite sides of the carriage 34 and on opposite pivot points of the container 46. The first and second container sheaves 78, 80 are part of the hoisting system 42 and are used to up-end and down-end the container 46 relative to the carriage 34, i.e., rotate the container 46 between the down-ended position (FIGS. 1B and 3) and the up-ended position (FIGS. 2 and 4). A cover 82 is pivotably coupled to a first end 86 of the carriage 34 for covering and closing an open end 90 of the container 46. When the cover 82 is pivoted to a closed position (FIG. 8A), the cover 82 holds the container 46 in the down-ended position and prevents rotation of the container 46 to the up-ended position. When the cover 82 is pivoted away from the container 46 to an open position (FIG. 9), the container 46 is allowed to rotate to the up-ended position.

The fuel transfer system 10 includes the boom assembly 22 (FIGS. 5A, 5B, and 6) for facilitating travel of the carriage 34 in conjunction with the hoisting system 42. The boom assembly 22 is received by the track assemblies 50, 54, 58 and travels along lower surfaces 94 of the track assemblies 50, 54, 58. The boom assembly 22 includes a main boom 98 (FIG. 5A) and a secondary boom 102 (FIG. 5B) received by the main boom 98 such that the secondary boom 102 telescopes (i.e., extends and retracts) relative to the main boom 98. The main boom 98 includes rollers 106 for traveling along the lower surfaces 94 of the track assemblies 50, 54, 58. The secondary boom 102 includes first rollers 110 proximate a first end 111 of the secondary boom 102 for traveling along the lower surfaces 94, and second rollers 112 proximate a second end 113 of the secondary boom 102 for traveling along rails 114 of the main boom 98. In the illustrated embodiment, the main boom 98 travels between the reactor building 14 and the canal 26. The secondary boom 102 extends and retracts relative to the main boom 98, such that the secondary boom 102 travels between the reactor building 14, the canal 26, and the containment building 18.

Figure 6:
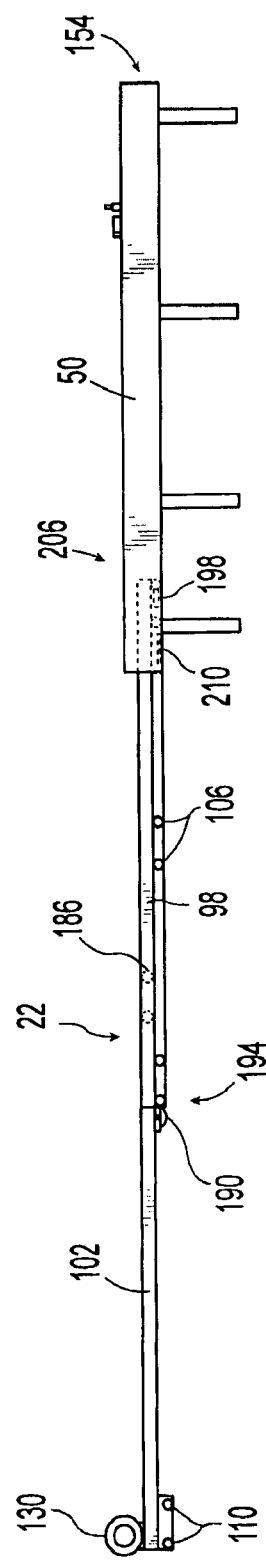
FIG. 6 illustrates the boom assembly in an extended position.

The hoisting system 42 moves the carriage 34 back and forth along the track assemblies 50, 54, 58 between the reactor building 14 and the containment building 18, up-ends and down-ends the container 46, and extends and retracts the boom assembly 22. Therefore, a single system is used to provide all three movements of the fuel transfer system 10. In the illustrated embodiment, the hoisting system 42 includes a first carriage hoist 118 (FIGS. 1A and 10), a second carriage hoist 122 (FIGS. 1A and 11), a boom hoist 126 (FIGS. 1A and 12), a plurality of sheaves (FIG. 7A) coupled to the holding room track assembly 50, the container sheaves 78, 80 (FIGS. 8A and 8B) coupled between the carriage 34 and the container 46, two sheaves coupled to the main boom 98 (FIG. 5), and a pulley 130 coupled to the secondary boom 102 (FIGS. 1A, 5, and 6). The hoists 118, 122, 126 are supported by a pair of rails 134 (FIG. 1A) coupled to a wall of the reactor building 14, and are positioned above the holding room track assembly 50.

Figure 10:
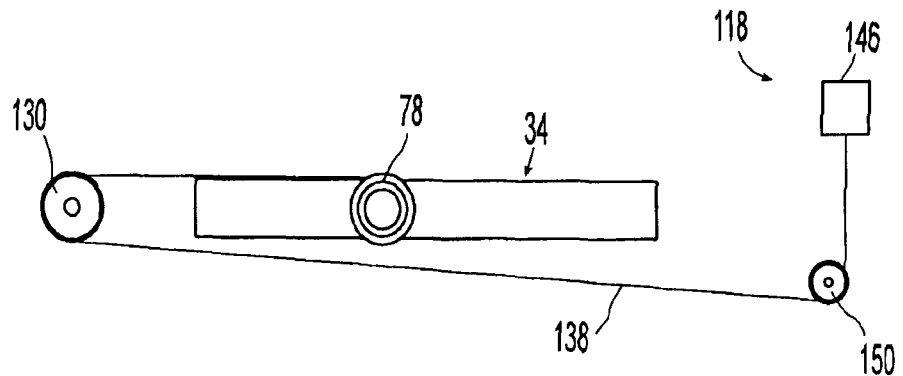
FIG. 10 illustrates a schematic diagram of a first carriage cable system for the fuel transfer system.

To move the carriage 34 along the track assemblies 50, 54, 58 and up-end and down-end the container 46, the first and second carriage hoists 118, 122 pay-out, or release, and take-up a first carriage cable 138 (FIG. 10) and a second carriage cable (FIG. 11) respectively, both of which pass along a plurality of sheaves of the hoisting system 42. Referring to FIG. 10, the first carriage cable 138 begins at a drum 146 of the first carriage hoist 118 and extends to the first carriage sheave 150 (FIGS. 7A and 10) mounted to a first end 154 of the holding room track assembly 50. The first carriage cable 138 then passes around the first carriage sheave 150 and extends to a bottom of the pulley 130 (FIGS. 5B and 10) on the secondary boom 102. The first carriage cable 138 passes around the pulley 130 and terminates on the first container sheave 78 (FIGS. 8B and 10). The first carriage cable 138 is used for extending the carriage 34 out of the reactor building 14 and rotating the container 46 to the up-ended position.

Figure 11:
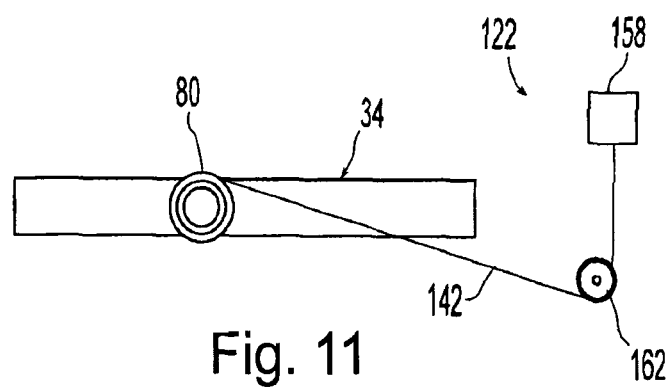
FIG. 11 illustrates a schematic diagram of a second carriage cable system for the fuel transfer system.

Referring to FIG. 11, the second carriage cable 142 begins at a drum 158 of the second carriage hoist 122. The second carriage cable 142 extends to a top of a second carriage sheave 162 (FIGS. 7A and 11) coupled to the first end 154 of the holding room track assembly 50, passes around the second carriage sheave 162, and extends to a top of the second container sheave 80 (FIGS. 8B and 11) mounted between the container 46 and the carriage 34. The second carriage cable 142 terminates at the second container sheave 80. The second carriage cable 142 is used for retracting the carriage 34 into the reactor building 14 and rotating the container 34 to the down-ended position.

Figure 12:
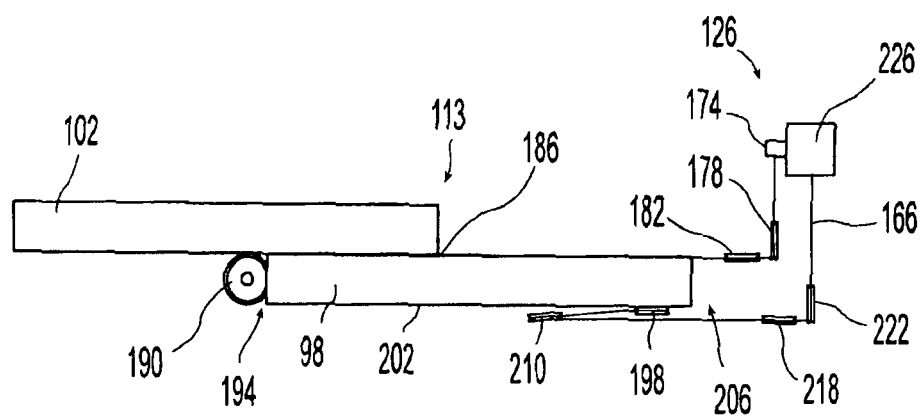
FIG. 12 illustrates a schematic diagram of a boom cable system for the fuel transfer system.

Referring to FIG. 12, the boom hoist 126 pays-out and takes-up a boom cable 166 passing along a plurality of sheaves to extend and retract the boom assembly 22. By extending and retracting the boom assembly 22, the pulley 130 (FIG. 5B) on the secondary boom 102 moves relative to the carriage 34 to thereby facilitate movement of the carriage 34 along the track assemblies 50, 54, 58. The boom cable 166 begins at a smaller diameter drum 174 of the boom hoist 126 and extends to a first retract sheave 178 (FIGS. 7A and 12) coupled to the first end 154 of the holding room track assembly 50. The boom cable 166 then passes to a second retract sheave 182 (FIGS. 7A and 12) also coupled to the first end 154 of the holding room track assembly 50 and passes through the first end 154. The boom cable 166 extends to a securing point 186 (FIGS. 5B and 12) proximate the second end 113 of the secondary boom 102. The securing point 186 may include, for example, a bracket or bolt to hold the boom cable 166 stationary in relation to the secondary boom 102.

Next, the boom cable 166 extends from the securing point 186 to a first boom sheave 190 (FIGS. 5A and 12) coupled to a first end 194 of the main boom 98 (i.e., the end closest to the containment building 18). The boom cable 166 passes around the first boom sheave 190 and extends to a second boom sheave 198 (FIGS. 5A and 12) coupled to a bottom surface 202 of the main boom 98 at a second end 206 of the main boom 98. The boom cable 166 then extends to a track sheave 210 (FIGS. 7A and 12) coupled to a second end 214 of the holding room track assembly 50. After passing around the track sheave 210, the boom cable 166 passes through the first end 154 of the holding room track assembly 50 and extends to a first extend sheave 218 (FIGS. 7A and 12) mounted to the first end 154. The boom cable 166 then passes to a second extend sheave 222 (FIGS. 7A and 12) also mounted on the first end 154 of the holding room track assembly 50 and extends upward to terminate at a larger diameter drum 226 of the boom hoist 126. In one embodiment, the boom cable 166 is formed from two separate cables, such that one cable extends between the small diameter drum 174 and the securing point 186 and a second cable extends between the securing point 186 and the large diameter drum 226. The separate cables would likewise engage all the respective sheaves between the termination points.

When the smaller diameter drum 174 releases the boom cable 166 and the larger diameter drum 226 takes-up the boom cable 166, a first distance between the track sheave 210 and the second boom sheave 198 is decreased or shortened (i.e., the distance between the two sheaves 198, 210 becomes smaller). Decreasing the first distance causes the main boom 98 to travel along the track system 38 from the holding room track assembly 50 to the canal track assembly 54. Likewise, at this time, a second distance between the first boom sheave 190 and the securing point 186 is also decreased, moving the secondary boom 102 relative to the main boom 98 from the canal track assembly 54 to the holding room track assembly 58.

When the larger diameter drum 226 releases the boom cable 166 and the smaller diameter drum 174 takes-up the boom cable 166, the first distance and the second distance are increased, thereby moving (i.e., retracting) the boom assembly 22 into the reactor building 14. The secondary boom 102 moves relative to the main boom 98 from the holding room track assembly 58 and is received by the main boom 98. The main boom 98 and the secondary boom 102 then travel from the canal track assembly 54 to the holding room track assembly 58.

During extension of the boom assembly 22, a constant total length of boom cable 166 is always released by the boom hoist 126. In other words, the amount of boom cable 160 engaging the sheaves and the boom assembly 22 is always the same. The ratio of a first boom cable length between the securing point 186 and the smaller diameter drum 174 and a second boom cable length between the securing point 186 and the larger diameter drum 226 varies during operation. In the illustrated embodiment, the larger diameter drum 226 has a diameter approximately twice a diameter of the smaller diameter drum 174. Therefore, the track sheave 210 has a diameter approximately twice the diameter of the second boom sheave 198 to keep the total length of boom cable 166 released by the boom hoist 126 constant. It should be readily apparent to those skilled in the art to that a greater or smaller diameter ratio or fewer or more sheaves may be used to account for the different diameters of the drums 174, 226.

In operation, the larger diameter drum 226 pays-out the boom cable 166 while the smaller diameter drum 174 takes-up the boom cable 166 to move the boom assembly 22 and the pulley 130 toward the containment building 18. The first carriage hoist 118 pays-out the first carriage cable 138 to the pulley 130 as the boom assembly 22 enters the containment building 18 and the pulley 130 approaches a first hard stop 230 (FIG. 7C) at a second end 234 of the containment track assembly 58. The first carriage hoist 118 then takes-up the first carriage cable 138 to extend the carriage 34 into the containment building 18 and up-end the container 46 once the carriage 34 reaches the second end 234 of the containment track assembly 58. The boom hoist 126 operates to extend the secondary boom 102 further into the containment building 18 and move the pulley 130 closer to the second end 234 of the containment track assembly 58. After the fuel bundle is removed from the container 46, the second carriage hoist 122 takes-up the second carriage cable 142 to down-end the container 46 and return the carriage 34 to the reactor building 14. The boom hoist 126 then operates in reverse such that the larger diameter drum 226 takes-up the boom cable 166 while the smaller diameter drum 174 pays-out the boom cable 166 to retract the boom assembly 22 back into the reactor building 14.

Figure 9:
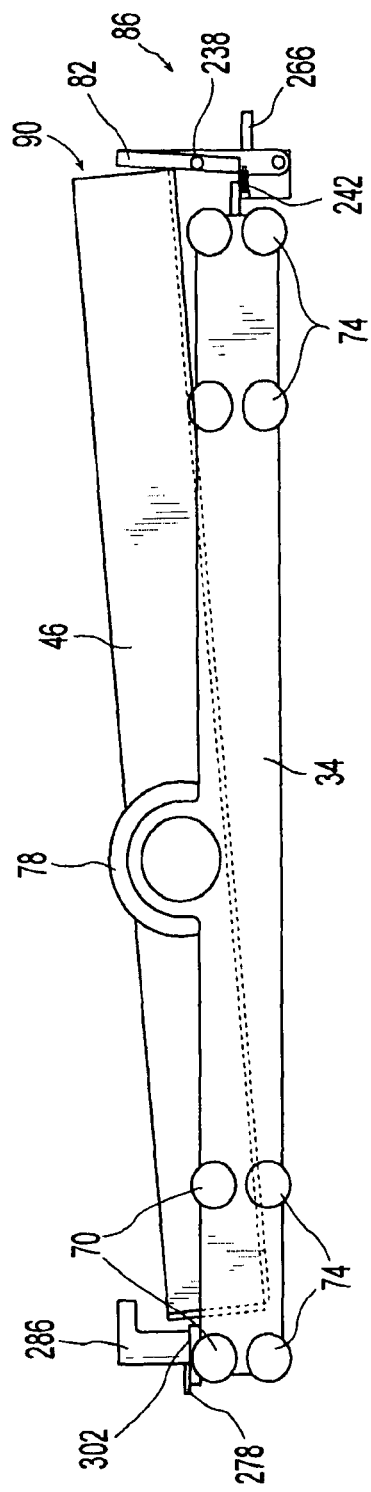
FIG. 9 illustrates the carriage supporting the container with the container pivoting towards the up-ended position.

As discussed above, the cover 82 closes the open end 90 of the container 46 and maintains the container 46 in the down-ended position by keeping the container 46 from rotating to the up-ended position. Referring to FIGS. 8A, 8B, and 9, the cover 82 includes a pair of outwardly extending fingers 238 and a spring 242 to bias the cover 82 to the closed position. When the carriage 34 is extended and moves from the reactor building 14 toward the containment building 18, the cover 82 is biased to the closed position (FIGS. 8A and 8B) by the spring 242 and the first carriage hoist 118 is prevented from up-ending the container 46. Once the carriage 34 reaches the containment building 18, stops 246 (FIG. 7C), which are mounted to the rail 62 of the containment track assembly 58, engage the fingers 238 of the cover 82 to pivot the cover 82 to the open position (FIG. 9). As the first carriage hoist 118 continues to take-up the first carriage cable 138, the container 46 rotates to the up-ended position. Once the carriage 34 is retracted from the containment building 18 by the second carriage hoist 122, the container 34 is down-ended and the cover 82 releases from the stops 246 and biases back to the closed position.

The container 46 remains down-ended and closed until the carriage 34 reaches the reactor building 14 and contacts a second hard stop 250 (FIG. 7A) positioned proximate the first end 154 of the holding room track assembly 50. The holding room track assembly 50 includes a pair of levers 254 coupled to the rail 62 of the holding room track assembly 50, one on each side. Each lever 254 includes an actuator 258 to move the lever 254 relative to the rail 62 (i.e., generally upwardly or downwardly). When the carriage 34 retracts into the reactor building 14 and the first end 86 of the carriage 34 reaches the second hard stop 250, the actuators 258 extend the levers 254 to engage the fingers 238 of the cover 82 and release the cover 82 to the open position. Thereby, the container 46 is allowed to rotate to the up-ended position. Retracting the actuators 258 disengages the levers 254 from the fingers 238, which causes the cover 82 to bias back to the closed position. In further embodiments, the levers 254 may be manually actuated so that no electricity is required to pivot the cover 82.

When the carriage 34 is at the home position in the reactor building 14, a first pin 262 (FIG. 7A) mounted to the holding room track assembly 50 locks the carriage 34 in the home position. The first end 86 of the carriage 34 includes a bracket 266 having an aperture 270 (FIG. 8B). The first pin 262 is received by the aperture 270 to hold the carriage 34 in the home position. The first pin 262 may be actuated by an electrical solenoid or manually displaced by a lever to slide downward into the aperture 270. In the illustrated embodiment, the first pin 262 is positioned adjacent to the second hard stop 250 of the holding room track assembly 50.

When the carriage 34 is at the unloading position in the containment building 18, a latch pin 274 and a latch 278 operate to lock the carriage 34 in the home position. The latch pin 274 (FIG. 7C) extends from a bracket 282 coupled to the rail 62 at the second end 234 of the containment track assembly 58. The bracket 282 extends laterally inward from the rail 62 to the carriage travel path and the latch pin 274 extends upwardly from the bracket 282. The carriage 34 includes the latch 278 (FIGS. 8A and 8B) and an L-shaped carriage bracket 286 (FIG. 8A), which are coupled to a second end 290 of the carriage 34. The latch 278 is rotatably coupled to the second end 290 of the carriage 34 and moves between an open position (FIG. 8B), whereby the carriage 34 is free to move along the track system 38, and a closed position (FIG. 9), whereby the carriage 34 is locked in the unloading position. A lower portion of the carriage bracket 286 includes a bracket slot 294 that allows the latch 278 to pass therethrough. The carriage bracket 286 is movable between a first position (FIG. 8A), in which the carriage bracket 286 is held up by the container 46, and a second position (FIG. 9), in which the carriage bracket 286 moves downward relative to the carriage 34 to prevent the latch 278 from entering the bracket slot 294.

In the open position, the carriage bracket 286 is held up by the container 46, thereby positioning the bracket slot 294 in-line with the latch 278 to allow the latch 278 to pass through when rotating between the open position and the closed position. As the carriage 34 travels along the containment track assembly 58, the carriage 34 is stopped in the containment building 18 by the first hard stop 230. Simultaneously, the latch pin 274 enters a latch slot 298 on the latch 278 and causes the latch 278 to rotate clockwise through and past the bracket slot 294. When the container 46 rotates to the up-ended position, the carriage bracket 286 drops downward to the second position such that the bracket slot 294 in unaligned with the latch 278. In one embodiment, a spring (not shown) may be coupled between the carriage 34 and the carriage bracket 286 to bias the carriage bracket 286 downward. A stop pin 302 on the carriage bracket 286 prevents the carriage bracket 286 from sliding off the carriage 34. When the carriage bracket 286 is in the second position, the carriage bracket 286 prevents the latch 278 from rotating counter-clockwise back to the open position, thereby restraining the carriage 34 from retracting towards the reactor building 14. Rotating the container 46 back to the down-ended position lifts the carriage bracket 286, thereby allowing the latch 278 to freely rotate out of the bracket slot 294.

All of the moving parts of the fuel transfer system 10 are located in the reactor building 14 of the facility. Those parts that move into the containment building 18 may be moved to the reactor building 14 for maintenance. Therefore, planned maintenance and outage times are decreased because all of the moving parts may be positioned in the reactor building 14 without having to drain the containment building 18. Also, separate up-ending and down-ending machines are not required on both sides of the containment wall 30. The up-ending and down-ending of the container 46 relative to the carriage 34 is all done by the hoisting system 42 located in the reactor building 14. Therefore, the fuel transfer system 10 has fewer moving parts and systems to maintain.

The foregoing description of the present invention has been presented for purposes of illustration and description. Furthermore, the description is not intended to limit the invention to the form disclosed herein. Consequently, variations and modifications commensurate with the above teachings, and the skill or knowledge of the relevant art, are within the scope of the present invention. The embodiments described herein are further intended to explain best modes known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art. Various features and advantages of the invention are set forth in the following claims.

What is claimed is:

1. A fuel transfer system for transporting spent fuel from a first room to a second room, the system comprising:
   a carriage configured for travel between the first room and the second room;
   a boom assembly that extends and retracts between the first room and the second room; and
   a hoist system positioned in the first room, the hoist system including at least one boom cable interconnected with the boom assembly to extend and retract the boom assembly and the hoist assembly including at least one carriage cable interconnected with the carriage to move the carriage.

2. The system of claim 1 wherein the carriage includes a container, the container pivotably mounted to the carriage and rotatable between an up-ended position and a down-ended position.

3. The system of claim 2 wherein the container includes a cover, the cover pivotable between a closed position and an open position to allow rotation of the container.

4. The system of claim 3 wherein the container includes a spring for biasing the cover to the closed position.

5. The system of claim 3, and further comprising at least one actuator positioned in the first room, wherein actuation of the at least one actuator engages a portion of the cover to pivot the cover to the open position.

6. The system of claim 3, and further comprising at least one stop positioned in the second room, the at least one stop configured to engage a portion of the cover to pivot the cover to the open position.

7. The system of claim 2 wherein the at least one carriage cable facilitates rotation of the container between the up-ended position and the down-ended position.

8. The system of claim 1 wherein the boom assembly includes a first boom and a second boom slidably received by the first boom.

9. The system of claim 8 wherein the second boom includes a carriage pulley, the carriage pulley positioned to engage the at least one carriage cable to facilitate travel of the carriage.

10. The system of claim 1, and further comprising a track assembly, wherein the carriage is configured to travel along the track assembly.

11. The system of claim 1, and further comprising at least one pin wherein the at least one pin is positioned in the first room, and further wherein the carriage includes a bracket configured to engage the at least one first pin to hold the carriage in the first room.

12. The system of claim 1, and further comprising at least one pin wherein the at least one pin is positioned in the second room, and further wherein the carriage includes a bracket configured to engage the at least one first pin to hold the carriage in the second room.

13. A fuel transfer system for transporting spent fuel from a first room to a second room, the system comprising:
   a carriage configured for travel between the first room and the second room, the carriage including a container pivotably mounted to the carriage;
   a boom assembly that extends and retracts between the first room and the second room, wherein the boom assembly facilitates travel of the carriage; and
   a hoist system positioned in the first room, the hoist system including at least one boom cable interconnected with the boom assembly to extend and retract the boom assembly, and the hoist assembly including at least one carriage cable interconnected with the carriage to extend and retract the carriage and to up-end and down-end the container relative to the carriage.

14. The system of claim 13 wherein the boom assembly includes a first boom and a second boom, the second boom slidably received by the first boom.

15. The system of claim 14 wherein second boom includes a carriage pulley, the carriage pulley positioned to engage the at least one carriage cable to facilitate travel of the carriage.

16. The system of claim 13, and further comprising a track assembly, wherein the carriage is configured to travel along the track assembly.

17. A fuel transfer system for transporting spent fuel from a first room to a second room, the system comprising:
   a carriage configured for travel between the first room and the second room;
   a first boom configured to extend from the first room to the second room;
   a second boom slidably received by the first boom and configured to extend into the second room, wherein extension of the first boom and the second boom facilitates travel of the carriage; and
   a hoist system positioned in the first room, the hoist system including a boom cable interconnected with the first boom and the second boom to extend and retract the first boom and the second boom, and at least one carriage cable interconnected with the carriage to move the carriage.

18. The system of claim 17 wherein the carriage includes a container, the container pivotably mounted to the carriage and rotatable between an up-ended position and a down-ended position.

19. The system of claim 18 wherein the at least one carriage cable facilitates rotation of the container between the up-ended position and the down-ended position.

20. The system of claim 17 wherein the second boom includes a carriage pulley, the carriage pulley positioned to engage the at least one carriage cable to facilitate travel of the carriage.

21. The system of claim 17, and further comprising a track assembly, wherein the carriage is configured to travel along the track assembly.

22. The system of claim 17, and further comprising at least one extend sheave positioned in the first room, at least one retract sheave positioned in the first room, at least one track sheave positioned in the first room, and at least one boom sheave positioned on the first boom, wherein the boom cable engages the sheaves to facilitate extension and retraction of the first boom and the second boom.

23. The system of claim 22 wherein the boom cable includes a first section and a second section, the first section of the boom cable engages the at least one retract sheave and couples to a termination point on the second boom to facilitate retraction of the first boom and the second boom, and the second section of the boom cable engages the at least one extend sheave and the at least one boom sheave and couples to the termination point to facilitate extension and retraction of the first boom and the second boom.

24. The system of claim 17, and further comprising a first carriage sheave positioned in the first room, a second carriage sheave positioned in the first room, and a pulley positioned on the second boom, wherein the at least one carriage cable includes a first carriage cable and a second carriage cable, and further wherein the first carriage cable engages the first carriage sheave and the pulley and couples to the carriage to facilitate travel of the carriage toward the second room, and the second carriage cable engages the second carriage sheave and couples to the carriage to facilitate travel of the carriage toward the first room.

* * * * *